United States Patent
Cholas et al.

(10) Patent No.: US 8,553,882 B2
(45) Date of Patent: Oct. 8, 2013

(54) METHODS AND APPARATUS FOR CONNECTING A CABLE NETWORK TO OTHER NETWORK AND/OR DEVICES

(75) Inventors: Chris Cholas, Frederick, CO (US); George Sarosi, Charlotte, NC (US); William Helms, Longmont, CO (US); Louis D. Williamson, Denver, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 1397 days.

(21) Appl. No.: 12/060,852

(22) Filed: Apr. 1, 2008

(65) Prior Publication Data

US 2008/0247541 A1 Oct. 9, 2008

Related U.S. Application Data

(63) Continuation-in-part of application No. 11/378,129, filed on Mar. 16, 2006, now Pat. No. 8,347,341.

(60) Provisional application No. 60/909,476, filed on Apr. 1, 2007.

(51) Int. Cl.
*H04N 7/167* (2011.01)
*H04N 5/91* (2006.01)
*H04N 7/16* (2011.01)
*H04N 7/173* (2011.01)
*H04N 7/12* (2006.01)
*G06F 15/16* (2006.01)
*G06F 12/14* (2006.01)
*H04L 12/56* (2011.01)
*G06F 15/173* (2006.01)
*H04L 12/28* (2006.01)
*H04N 7/10* (2006.01)
*H04N 21/41* (2011.01)

(52) U.S. Cl.
USPC ............. 380/210; 370/401; 386/131; 725/62; 375/240.01; 713/189

(58) Field of Classification Search
USPC .......... 380/210; 370/401; 386/131; 725/62; 375/240.01; 713/189
See application file for complete search history.

(56) References Cited

U.S. PATENT DOCUMENTS

| | | | |
|---|---|---|---|
| 2004/0136457 A1* | 7/2004 | Funnell et al. | 375/240.01 |
| 2006/0123246 A1* | 6/2006 | Vantalon et al. | 713/189 |
| 2007/0147804 A1* | 6/2007 | Zhang et al. | 386/131 |
| 2007/0217436 A1* | 9/2007 | Markley et al. | 370/401 |
| 2009/0320077 A1* | 12/2009 | Gazdzinski | 725/62 |

FOREIGN PATENT DOCUMENTS

WO  WO 2012094258 A1 * 7/2012

OTHER PUBLICATIONS

Hart, G.M. ; Hamilton-Piercy, N.F.; "A broadband urban hybrid coaxial/fiber telecommunications network"; IEEE, vol. 1, Issue: 1 Digital Object Identifier: 10.1109/73.80365 Publication Year: Feb. 1990, pp. 38-45.*

* cited by examiner

*Primary Examiner* — Andrew L Nalven
*Assistant Examiner* — Courtney Fields
(74) *Attorney, Agent, or Firm* — Straub & Pokotylo; Michael P. Straub; Stephen T. Straub

(57) ABSTRACT

Methods and apparatus for connecting, e.g., bridging, a cable network to other networks and/or devices is described. A bridge device facilitates the distribution of cable provider content to end users operating IP based devices. The bridge device performs one of more of the following: interface protocol conversions, user device controlled tuner selection, transcoding of data, transrating of a data stream, decryption in accordance with a conditional access protocol and re-encryption in accordance with an authorized service domain protocol.

26 Claims, 8 Drawing Sheets

METHODS AND APPARATUS FOR CONNECTING A CABLE NETWORK TO OTHER NETWORK AND/OR DEVICES

RELATED APPLICATION

The present application is a continuation-in-part of U.S. patent application Ser. No. 11/378,129, filed Mar. 16, 2006 now U.S. Pat. No. 8,347,341 and the present application also claims the benefit of U.S. Provisional Patent Application Ser. No. 60/909,476, filed Apr. 1, 2007 and wherein the Provisional Patent Application Ser. No. 60/909,476 is hereby expressly incorporated by reference in its entirety.

FIELD

Various embodiments relate to cable network content distribution and, more particularly, to methods and apparatus for bridging a cable network to other networks and/or devices, e.g., IP based user devices.

BACKGROUND

A cable network provider has available a wide range of content, e.g., video content, which is made available to its subscribers through a set top box (STB) interface coupled to specific types of display devices such as a television or video recorder which accommodate the video output format of the STB. With the proliferation of different types of IP based user devices supporting video/audio capabilities, there is a need for methods and apparatus that could allow these IP based user devices to also be coupled to a cable network and/or also be able to access content typically restricted to cable type video format devices such as set top boxes.

SUMMARY

Various embodiments are directed to methods and apparatus related to facilitating the communication of information between a cable network and Internet Protocol (IP) based end user devices. A bridge device in accordance with the present invention facilitates the distribution of cable provider content to end users operating IP based devices. The bridge device performs protocol conversion operations. In various, but not necessarily all embodiments, the bridging device is implemented without the use of a full video decoder and/or composite video outputs. In such implementations, the bridge device may be easier to implement, from a hardware perspective, then a full set-top box responsible for decoding and outputting decoded video to another device, e.g., a television. In such embodiments the user device, e.g., P.C., receiving the video may perform the decoding. In various embodiments, the bridge device performs one of more of the following: interface protocol conversions, user device controlled tuner selection, transcoding of data, transrating of a data stream, decryption in accordance with a conditional access protocol and re-encryption in accordance with an authorized service domain protocol.

An exemplary method of providing content, in accordance with some embodiments, comprises: receiving content via a cable network; and operating a bridging device to interface between said cable network and at least one of: i) a non-cable network and ii) an end user device. An exemplary bridging device, in accordance with some embodiment, comprises: a cable network interface for receiving content via a cable network; a second interface for interfacing said bridging device to at least one of i) a non-cable network and ii) an end user device; and a protocol conversion module for performing a protocol conversion between a first protocol used by said cable network interface and a second protocol used by said second interface, said second protocol being different from said first protocol.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
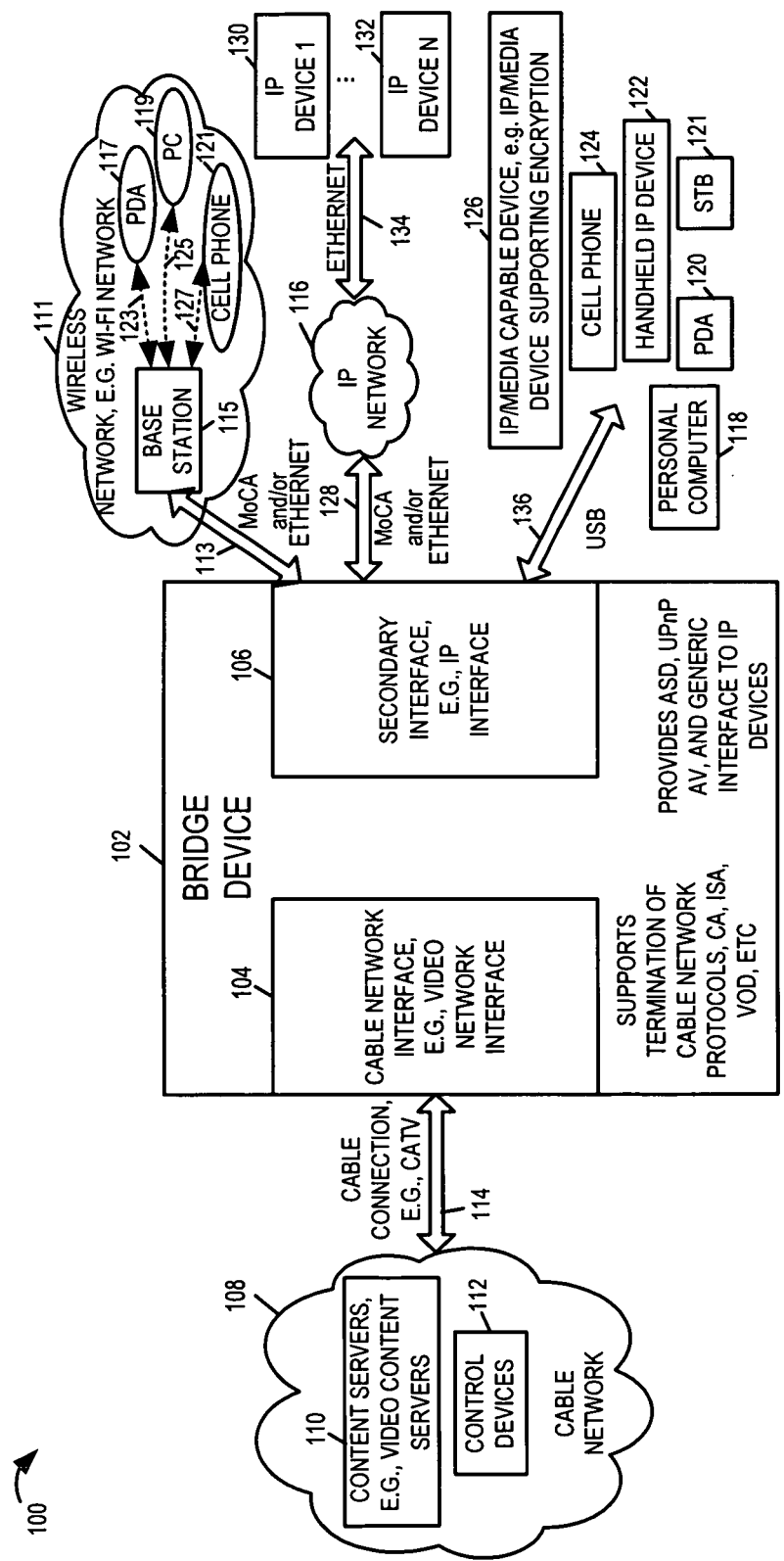
FIGS. 1 and 2 illustrate exemplary communications systems implemented in accordance with the present invention.

FIG. 1 is a drawing of an exemplary system 100 including content delivery, e.g., video content delivery, to end users in accordance with various embodiments of the present invention. The exemplary system 100 includes a novel bridge device 102 in accordance with the present invention. The bridge device 102 includes a cable network interface 104, e.g., video network interface, and a secondary interface 106, e.g., an IP interface. A cable network 108, e.g., a video network, including content servers 110, e.g., video content servers, and control devices 112 is coupled to the cable network interface 104. The cable network interface 104 is coupled to a standard cable connection 114, e.g., a community access television CATV connection, sometimes referred to as a cable TV connection. The IP interface 106 couples the bridge device 102 to an Internet Protocol (IP) network 116, a wireless network 111, e.g., a Wi-FI network, and/or one or more IP based devices such as personal computers 118, PDAs 120, STBs 121, handheld IP devices 122, cell phones 124, and/or other IP/media devices 126, e.g., IP/media capable devices which support encryption. In this exemplary embodiment, the IP network 116 is coupled to the IP interface 106 of the bridge device 102 via a MoCA connection and/or an Ethernet connection 128. In addition, the IP network 116 is coupled to additional IP devices (IP device 1 130, . . . , IP device N 132) via an Ethernet 134. Various other IP based devices (118, 120, 121, 122, 124, 126) are coupled to the IP interface 106 of the bridge device 102 via a USB connection 136. Base station 115 of wireless network 111 is coupled to the IP interface 106 of the bridge device 102 via an Ethernet and/or MoCA connection 113. Various wireless devices (PDA 117, personal computer 119, cell phone 121) of the wireless network 111 are coupled to base station 115 via wireless links (123, 125, 127), respectively.

The bridge device 102 allows cable network content, e.g., video network content, to be accessed and viewed using IP based user devices. The IP based user devices such as, e.g., a personal computer 118, perform the final video decoding and/or display functions. The bridge device 102 performs protocol conversion operations between protocols used by the cable provider network 108 to various IP based protocols used by typical customer IP devices such as, e.g., personal computer 118. For example, the bridge device 102 allows a user to access content, e.g., video content available from a cable provider, without having to install a special cable modem in the user's PC. The cable network interface 104, e.g. video network interface, of the bridge device 102 and/or associated modules terminates cable network protocols, e.g., video network protocols such as e.g., conditional access (CA), industry standard architecture (ISA), video on demand (VOD), etc. The IP interface 106 of the bridge device 102 provides authorized service domain (ASD), universal plug and play audio video (UPnP AV), and other generic interfaces to various IP devices. In some embodiments, the IP devices coupled to the IP interface 106 of the bridge device 102 are part of a trusted domain, and the devices support encryption.

Figure 2:
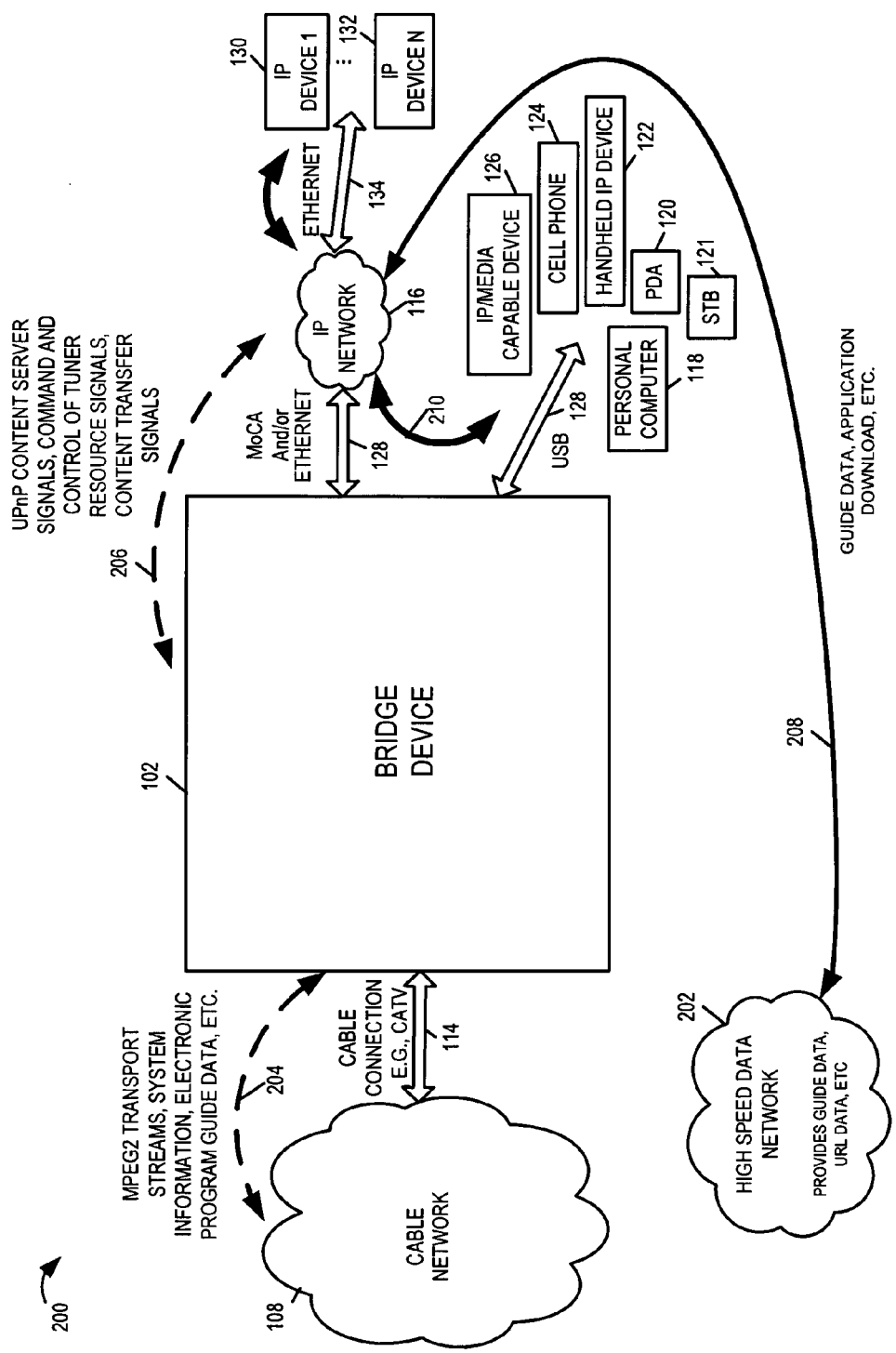

FIG. 2 is a drawing 200 of a variation of the exemplary system 100 of FIG. 1 illustrating some exemplary signaling. The system 200 of FIG. 2 also includes a High Speed Data (HSD) network 202 which is coupled to the IP network 116. Exemplary signaling 204 between the cable network 108 and the bridge device 102 includes moving picture experts group (MPEG) transports streams, e.g., MPEG2 transport streams, system information (SI) and electronic program guide (EPG) data. Exemplary signaling 206 between the bridge device 102 and IP network 116 includes universal plug and play (UPnP) content server signals, command and control tuner resource information, and content transfer signals. The HSD network 202 may, and sometimes does, provide signals 208 including guide data, application download information, uniform resource locator (URL) data, etc., to the IP network 116. The guide data, application download, URL data, etc. happens through a HSD connection to the customer premise, e.g., home. The high speed data network 202 provides a much larger pipe for communicating information than is typically used for such information with the cable network 108. A standard guide is provided via the cable network 108; however, a specialized, e.g., customized and interactive guide, is provided via the HSD connection from the HSD network 202. Specialized service provider application software is installed on the customer's IP device, e.g., PC. Accordingly, more detailed and/or interactive menu/guide information can be provided when the HSD connection, e.g., via the bridge 102, supplies menu/guide information for the video content being supplied via the cable network 108 to an end user device. Exemplary signaling 210 is, e.g., a customized and interactive guide sourced from the high speed data network 202 which is being forwarded to one or more of the end user devices (118, 120, 121 122, 124, 126) via bridge device 102. Thus, the bridge device 102 provides a way of taking advantage of features available from both the cable network 108 and data network 202, e.g., in a seamless manner.

In some embodiments a resource manager within the bridge device 102 handles multigroups and other content distribution functions. The media over coax (MoCA) distributes IP over coax. One or more streams can be sent to each IP user device. In some cases, the stream may be a point to point stream to an individual IP device. In some other cases, the stream may be a multicast stream available to a plurality of IP user devices, e.g., a plurality of IP devices coupled to the same Ethernet or local area network. In some embodiments, the IP device, e.g., IP device 1 130 which may be a PC sends channel/tuner commands and the bridge device 102 implements the received commands.

The bridge device 102 provides a bridging function between the video network 108 and IP devices (118, 120, 121, 122, 124, 126) at a customer premise, e.g., home. For example, video available on cable is made available on a personal computer 118, via the bridge device 102. The bridge device 102 allows connection from a video network 108 to personal computers, set top box devices, personal media devices and other IP based devices. The bridge device 102 converts, e.g., transcripts, content protection from a conditional access domain to an Authorized Service Domain (ASD). The conditional access domain uses the current encryption for video, while the authorized service domain uses encryption for trusted devices. Thus decrypt and re-encrypt operations are performed by the bridge device 102, and encrypted video content on the video network side may be converted to have different encryption on the IP side corresponding to different end users. Other operations of the bridge device 102 include, e.g., performing routing of content and/or MPEG, e.g., MPEG-2 transport streams, to the IP network. In addition, the bridge device routes and/or converts system information and other information such as guide information and tier information to the IP network 116 from the video network 108. Program guide conversion converts an electronic cable program guide to a format which can be presented to an IP device.

The bridge device 102 in some embodiments also supports resource pooling and home networking. An IP device typically does not have a tuner for tuning to QAM streams. In some embodiments, the bridge device 102 tunes, decrypts, and distributes to the IP network 116. The IP device decodes and displays the distributed information. The bridge device 102 has tuner capability for tuning QAM streams; however, in some embodiments, the bridge device 102 does not include decoding capability. In such an embodiment, the decoding is left to be performed in the IP network 116 and/or individual IP device. This approach facilities a simpler and less expensive bridge device design than would otherwise be implemented if the bridge device also performed full video decoding operations.

Figure 3:
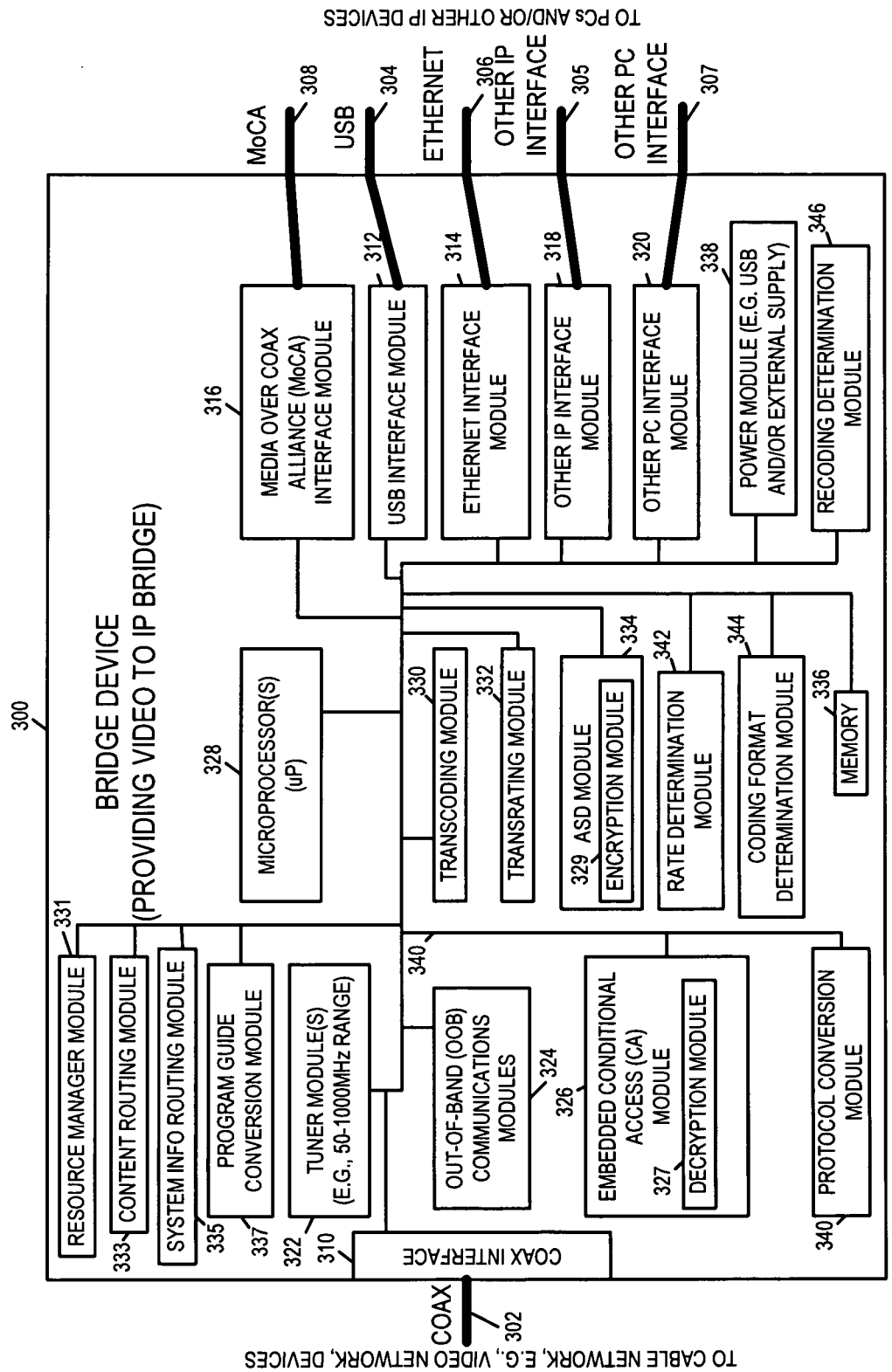
FIG. 3 illustrates an exemplary bridge device implemented in accordance with the invention.

FIG. 3 is a drawing of an exemplary bridge device 300 implemented in accordance with the present invention. The exemplary bridge device 300 may be the bridge device 102 of FIG. 1 or FIG. 2. The bridge device 300 provides a cable, e.g., video, to IP bridge, thus bridging a cable, e.g., video network, to IP devices on a customer premise network, e.g., a home network. The exemplary bridge device 300 is coupled to the cable network through a coaxial cable 302 and provides a USB connection 304, Ethernet connection 306, Multimedia over Coax Alliance (MoCA), other IP interface connection 305, and other PC interface connection 307 to the customer premise network, e.g., home network, and/or individual end user devices. The bridge device 300 serves video streams, Emergency Alert System (EAS) messaging, Electronic Program Guide (EPG) data, Video On Demand (VOD) and other interfaces from the cable network to the IP network in a generic way so that the IP devices can leverage the Hybrid Fiber-Coax (HFC) infrastructure. The bridge device 300 also bridges the copy protection and/or additional access on the video network to the Authorized Service Domain.

On the cable network, e.g., video network, side, there is a coax interface 310 which is coupled to cable network devices via coax cable 302. On the IP interface side, there are a plurality of alternative IP based interfaces, e.g., a USB interface module 312, an Ethernet interface module 314, a MoCA interface module 316, an other IP interface module 318, and an other PC interface module 320, e.g., an RS232 interface module and/or an RS422 interface module, etc.

The bridge device 300 includes a tuner module or modules 322, e.g., in the 50-1000 MHz range, an out-of-band (OOB) communications module or modules 324, an embedded conditional access (CA) module 326, one or more microprocessors (uP) 328, a transcoding module 330, a transrating module 332, an ASD module 334, memory 336, a power module 338, a media over coax alliance (MOCA) interface module 316, a USB interface module 312, an Ethernet interface module 314, an additional IP interface module 318, an additional PC interface module 320, a coax interface 310, a resource manager module 331, a content routing module 333, a system information routing module 335, a program guide conversion module 337, and a protocol conversion module 342 coupled together via one or more busses 340 over which the various elements may interchange data and information.

In one particular exemplary embodiment, the bridge device 300 is a standalone device having the following characteristics: the device is set-top-box (STB) type device that does not include an audio/video decoder which outputs unencoded audio/video for listening/display; does not include video outputs; and includes IP capable outputs including USB, MoCA and Ethernet. The bridge device 300 bridges video services to IP device(s). In some embodiments, the bridge device 300 includes a single tuner, while in other embodiments multiple tuners are included. The bridge device 300 includes embedded CAS. The bridge device 300 provides transcription from conditional access (CA) to authorized service domain (ASD). Embedded conditional access module 326 includes a decryption module 327 for decryption of received information using the conditional access protocol. In some embodiments transcoding and/or transrating functions are included and implemented by transcoding and/or transrating modules (330, 332). In some embodiments, the transcoding module 330 performs both a transcoding and transrating function.

The tuner 322 allows the bridge device 300 to tune in and receive a QAM communications channel. The Out of Band (OOB) Communication module 324, which is on the cable network, e.g., video network, side performs operations related to control channel signals communicated on out-of-band frequencies. The embedded conditional access (CA) module 326 which includes decryption module 327 performs conditional access decryption for the cable, e.g., video side. The transcoding module 330 converts between different formats used in cable devices to formats used in IP devices, e.g., converting from an MPEG-2 format to an MPEG-4 or Windows Media format. In some embodiments, the transcoding module 330 transcodes from an MPEG-2 Transport Stream (TS) or MPEG-4 part 10 content from the cable head end to Digital Living Network Alliance (DLNA) codecs. The transrating module 332 cuts an input stream to a lower bandwidth stream by performing re-encoding operations. In some embodiments, the power module 338 interfaces with and uses an external supply for power. In some embodiments, the power module 338 interfaces with and uses a USB connection 304 to receive power. The authorized service domain (ASD) module 334 which includes encryption module 329 performs encryption for re-encrypting into the ASD using an ASD protocol. In various embodiments, a navigator resides on a rendering device, e.g., a user IP device such as a PC, and does not reside within the bridge device 300.

In some embodiments transcription is performed from traditional conditional access (CA) technologies like PowerKey and/or Digicipher to in home Digital Rights Management (DRM), sometimes alternatively referred to as Digital Restrictions Management, or link protection such as Digital Transmission Content Protection (DTCP) over IP or Windows DRM or Fairplay. In some such embodiments, the transcription is performed by CA module 326 working in coordination with ASD module 334.

Protocol conversion module 340 performs a protocol conversion between (i) a first protocol used by the cable network interface, e.g., a protocol used for signals communicated through coax interface 310 which is coupled to a cable network, and (ii) a second protocol used by a second interface, the second protocol being different from the first protocol. The second interface, in bridge device 300 includes an MoCA interface, USB interface, Ethernet interface, addition IP interfaces, and additional PC interfaces. The first protocol is, e.g., a cable modem protocol and the second protocol is, e.g., an Ethernet protocol supporting the communication of IP packets.

In one exemplary embodiment, the bridge device 300 includes embedded software, e.g., in memory 336 and/or resident in other modules which, when executed, e.g., by one or more of the microprocessors 328, performs at least some of the following functions and/or has the following characteristics: routes MPEG2 transport streams to an IP network; includes sign-on capability to the cable network, e.g., video network; is field upgradeable; supports the Emergency Alert System (EAS), e.g., SCTE18 EAS; provides a Universal Plug and Play (UPnP) server, and provides a web server mechanism, accessible from the IP ports for diagnostics and configuration. The UPnP server: (i) delivers video/audio transport via UPnP AV, (ii) presents system channel line up, e.g., provides content directory service; (iii) performs tuner resource command and control, e.g., channel change, etc.; (iv) performs ASD functions including, e.g., authentication for cable distribution system (CDS) and PSP; (v) provides EAS services such as push alert and audio files and force tune event. Diagnostics included in the web server mechanism allow queering from the head end and on the customer side is implemented as a Web page. Diagnostics include man machine interface (MMI) type diagnostics and IP diagnostics. The web server mechanism also supports IP configuration operations.

In accordance with a feature of some embodiments, content access at least some of the IP devices is on a restricted basis. An authorized service domain (ASD) is constructed. An authorized service domain includes a trusted domain. A trust relationship exists with devices, e.g., the IP devices, and the cable network, e.g., the video network, concerning access. In various embodiments, a key on the IP device, e.g., PC is used for encryption and comes across with a private key for content.

Various bridge devices 300 are lower cost than full-fledged set-top boxes, as the bridge devices 300 do not typically include a video decoder or cable card. Thus a single home can have multiple low cost bridge devices 300 servicing a plurality of different IP based devices at the customer premise.

Resource manager module 331 within the bridge device 300 handles multigroups and other content distribution functions. One or more streams can be sent to each IP user device. In some cases, the stream may be a point to point stream to an individual IP device, e.g., in response to received channel and/or program request from an end user. In some other cases, the stream may be a multicast stream available to a plurality of IP user devices, e.g., a plurality of IP devices coupled to the same Ethernet or local area network.

Content routing module 333 performs routing of content and/or MPEG, e.g., MPEG-2 transport streams, information such as selected program information, to an IP network and/or particular IP device or devices. System information routing module 335 routes system information such as guide information and tier information from the cable network and/or high speed data network to the IP network, wireless network, and/or individual IP device or devices. Program guide conversion module 337 converts an electronic cable program guide, e.g., an electronic cable program guide formatted for use by a conventional cable system end user device, to a format which can be presented to an IP device.

Figure 4:
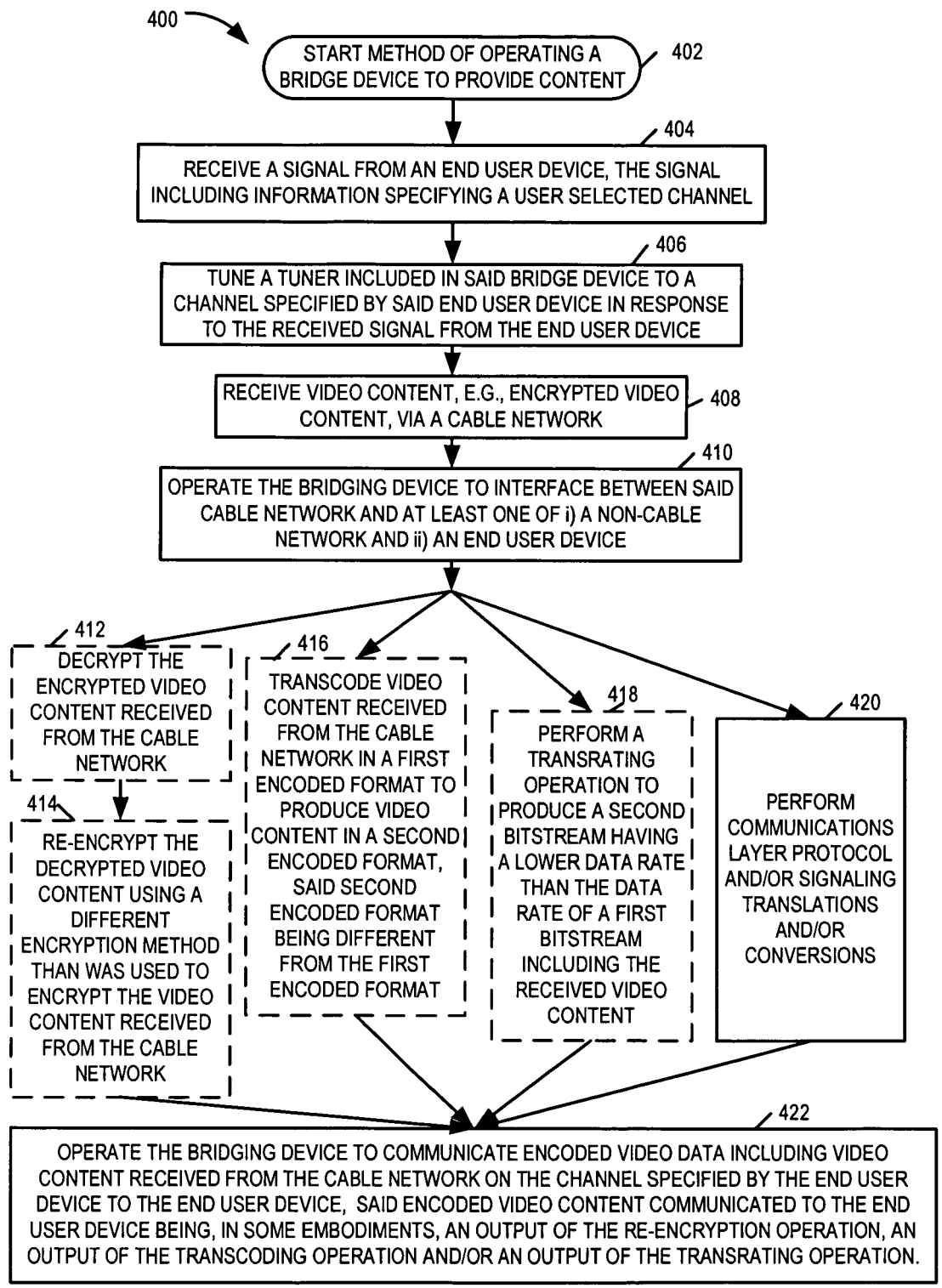
FIG. 4 illustrates a flowchart of an exemplary method of operating a bridge device in accordance with the present invention.

FIG. 4 is a flowchart 400 of an exemplary method of operating a bridge device to provide content, e.g., video content from a cable network to an end user device. The bridge device is, e.g., exemplary bridge device 300 of FIG. 3. In various embodiments, the bridging device does not include a video decoder for generating decoded video. Operation starts in step 402 where the bridge device is powered on and initialized and proceeds to step 404.

In step 404, the bridge device receives a signal from an end user device, the signal including information specifying a user selected channel. The end user device is, e.g., one of an IP device, a media capable device, a cell phone, a personal data assistant, and a personal computer. Then in step 406, the bridge device tunes a tuner included in the bridge device to a channel specified by the end user device in response to the received signal from the end user device. In various embodiments, the tuning involves selection of a QAM channel from among a plurality of alternative QAM channels. Operation proceeds from step 406 to step 408.

In step 408, the bridge device receives video content, e.g., encrypted video content via a cable network, and in step 410 the bridge device is operated to interface between the cable network and at least one of: i) a non-cable network and ii) an end user device. The non-cable network is, e.g., one of an Ethernet and a wireless network, e.g. a WI-FI network. In some embodiments, the end user device is coupled to the bridging device via the non-cable network. Operation proceeds from step 410 to step 420 and, in some embodiments, to one or more of steps 412, 416 and 418.

In step 420, the bridge device performs communications layer protocol and/or signaling translations and/or conversions. For example, in step 420 the bridging device performs a protocol conversion operation to convert between a communications format used by the cable network and a communications format used by the non-cable network. One exemplary protocol used by the cable network is a Transport layer protocol and one exemplary protocol used by a non-cable network is Internet Protocol. Operation proceeds from step 420 to step 422.

Returning to step 412, in step 412 the bridge device decrypts encrypted video content received from the cable network. The decryption is performed, e.g., by a conditional access module. Operation proceeds from step 412 to step 414, in which the bridge device re-encrypts the decrypted video content using a different encryption method than was used to encrypt the video content received from the cable network. The re-encryption is performed, e.g., by an authorized service provider module. In some embodiments transcription is performed from traditional conditional access (CA) technologies like PowerKey and/or Digicipher to in home Digital Rights Management (DRM), sometimes alternatively referred to as Digital Restrictions Management, or link protection such as Digital Transmission Content Protection (DTCP) over IP or Windows DRM or Fairplay. In some such embodiments, the transcription is performed by a CA module working in coordination with ASD module. Operation proceeds from step 414 to step 422.

Returning to step 416, in step 416 a transcoding module of the bridge device transcodes video content received from the cable network in a first encoded format to produce video content in a second encoded format, said second encoded format being different from the first encoded format. In one example, the first format is a MPEG-2 format while the second format is one of a MPEG-4 format and a Windows Media format. In some embodiments, the transcoding module transcodes from an MPEG-2 Transport Stream (TS) or MPEG-4 part 10 content from the cable head end to Digital Living Network Alliance (DLNA) codecs. In some embodiments, the transcoding of the video content produces a bitstream having a lower data rate than the data rate of a first bitstream including the received video content, the second bitstream being communicated to the end user device. Operation proceeds from step 416 to step 422.

Returning to step 418, in step 418 a transrating module of the bridge device performs a transrating operation to produce a second bitstream having a lower data rate than the data rate of a first bitstream including the received video content. Operation proceeds from step 418 to step 422.

In step 422 the bridge device communicates encoded video data including video content received from the cable network on the channel specified by the end user device to the end user device. In some embodiments, the encoded video content communicated to the end user device being an output of the re-encryption operation, an output of the transcoding operation and/or an output of the transrating operation.

Figure 5:
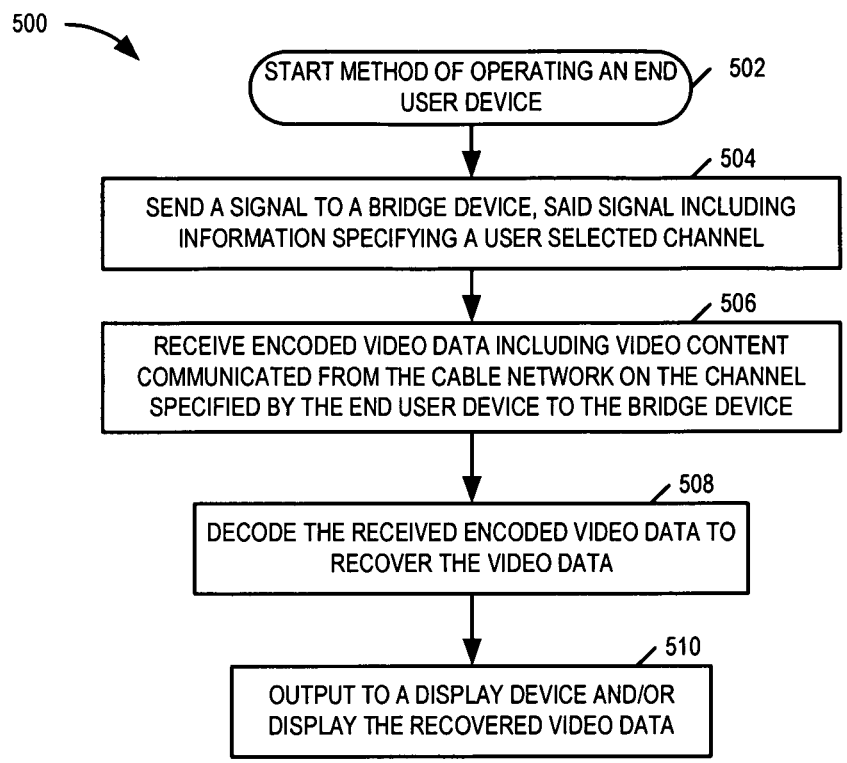
FIG. 5 illustrates a flowchart of an exemplary method of operating an end user device coupled to a bridge device in accordance with the present invention.

FIG. 5 is a flowchart 500 of an exemplary method of operating an end user device in accordance with an exemplary embodiment of the present invention. The end user device is, e.g., one of: an IP device, a media capable device, a cell phone, a personal data assistant and a personal computer. Operation of the exemplary method starts in step 502 where the end user device is powered on and initialized and proceeds to step 504. In step 504, the end user device sends a signal to a bridge device, said signal including information specifying a user selected channel. The bridge device is, e.g., a device which interfaces between a cable network and at least one of: i) a non-cable network such as an Ethernet network or a wireless communications network, e.g., a Wi-Fi network, and ii) an end user device. In one example, where the bridge device interfaces to the non-cable network, the end user device sends the signal to the bridge device via the non-cable network. In another example, the bridge device interfaces directly to the end user device, e.g., via a USB port connection.

Operation proceeds from step 504 to step 506. In step 506 the end user device receives signals including encoded video data including video content communicated from the cable network on the channel specified by the end user device to the bridge device. The bridge device has performed processing of signals received from the cable network to generate signals which are output from the bridge device directed toward the end user device. In some embodiments, the end user device received signals include re-encrypted video content which has been re-encrypted by the bridge device, where the encryption method used by the cable network is different than the encryption method used by the bridge device. In some embodiments, the end user device received signals include transcoded video content wherein the bridge device has transcoded video content from the cable network which used a first encoding format into a second encoding formati, which is different from the first encoding format. In some embodiments, the end user device received signals include a second bitstream having a lower data rate than a first bitstream received by the bridge device, wherein the second bitstream was generated from the first bitstream by a transrating operation performed by the bridge device. The end user device received signals are communicated using a communications format used by the non-cable network and/or user device, e.g., an IP format, while the signals received by the bridge device from which the end user device received signals are derived were communicated between the cable network and the bridge device using a different format, e.g., a cable signaling transport layer format, and the bridging device had performed a protocol conversion operation.

Operation proceeds from step 506 to step 508. In step 508 the end user device decodes the received encoded video data to recover video data. In some embodiments a decryption operation is also performed as part of or in addition to step 508. Operation proceeds from step 508 to step 510 in which the end user device outputs the recovered video data to a display device and/or displays the recovered video data.

Figure 6:
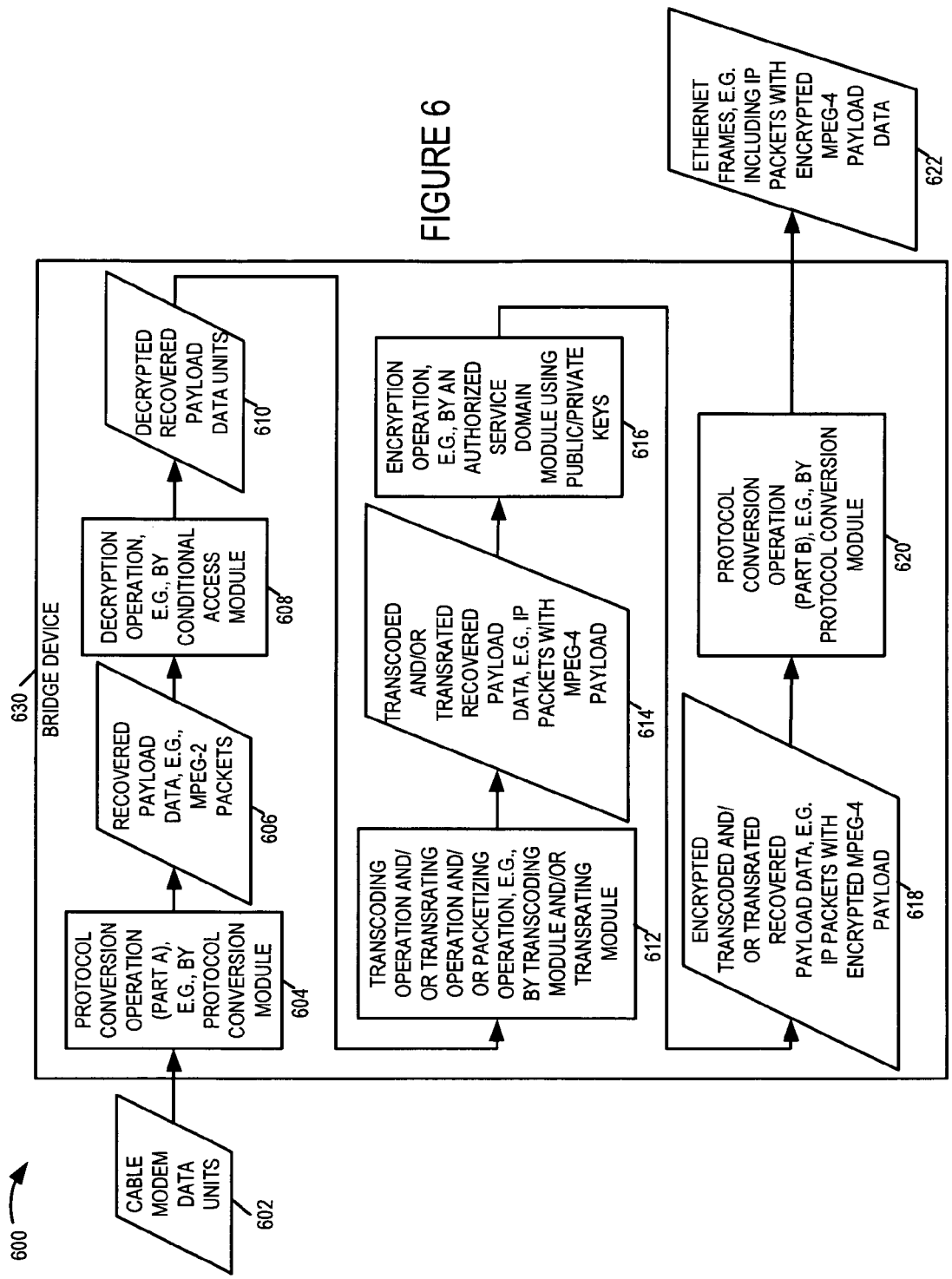
FIG. 6 is a drawing illustrating exemplary operations performed by a bridge device, input data, intermediary data, and output data in accordance with an embodiment of the present invention.

FIG. 6 is a drawing 600 illustrates exemplary operations performed by a bridge device 300 in accordance with an embodiment of the present inventions. Cable modem data units 602 are received as input to the bridge device via a cable network interface. The received input 602 is subjected to a protocol conversion operation (part A), e.g., by a protocol conversion module as indicated by box 604. The output of the part A protocol conversion is recovered payload data 606, e.g., MPEG-2 packets. The recovered payload data 606 is subjected to a decryption operation, e.g., by a conditional access module, as indicated by block 608. Operation 608 results in decrypted recovered payload data units 610.

A transcoding operation and/or transrating operation and/or packetizing operation is perfomed on the decrypted recovered payload data units 610, e.g., by a transcoding module and/or transrating module as indicated by block 612. This results in transcoded and/or transrated recovered payload data, e.g., IP packets with MPEG-4 payload 610. In various embodiments, when transrating is performed the data rate of the output bit stream is a reduced data rate with respect to an input bit stream.

Data 614 is subjected to an encryption operation, e.g., by an authorized service domain module using public/private keys as indicated by block 616. The encryption operation of block 616 uses a different encryption method than the encryption method used in generating cable modem packets 602. The result of the encryption operation of block 616 is encrypted transcoded and/or transrated recovered payload data, e.g., IP packets with encrypted MPEG-4 payload.

Then, the data 618 is subjected to a protocol conversion operation (part B), e.g., by the protocol conversion module as indicated by block 620. This operation results in Ethernet frames, e.g., Ethernet frames including IP packets with encrypted MPEG-4 payload data 622, which is communicated via a secondary interface of the bridge device 300.

Figure 7:
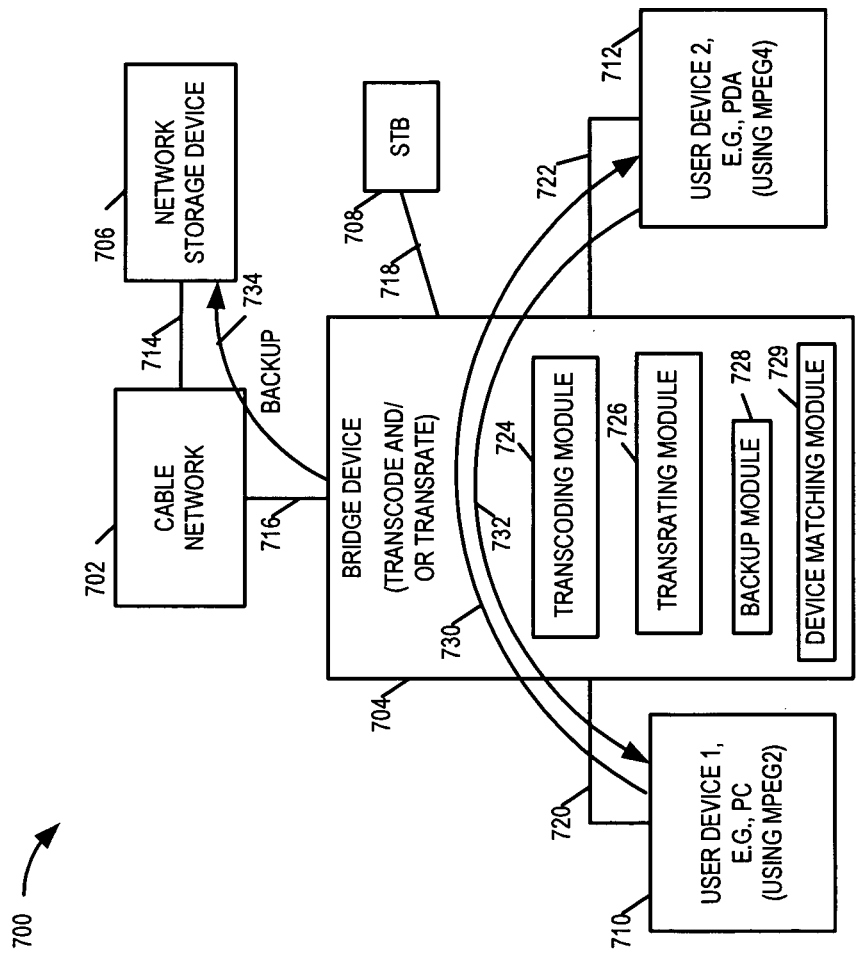
FIG. 7 is a drawing of an exemplary system including a bridge device which performs transcoding and/or transrating operations in accordance with the present invention.

FIG. 7 is a drawing of an exemplary system 700 including a bridge device 704 which performs transcoding and/or transrating operations in accordance with the present invention. Exemplary system 700 also includes a cable network 702, a set top box (STB) 708, user device 1 710 and user device 712 coupled to the bridge device 704 via connections (716, 718, 720 and 722), respectively. Different interfaces may be, and sometimes are used for the different connections. In addition, system 700 also includes a network storage device 706 coupled to the cable network 702 via link 714.

Bridge device 702 supports transcoding and transrating between different entities including between different end user devices. Thus bridge device 702 serves as a bridge between connected devices, e.g., a PC and a PDA, allowing otherwise incompatible end user devices, which use different formats, to communicate because the bridge device 702 performs trancoding and/or transrating operations. In addition, the bridge device 702 can transcode/transrate content supplied by the cable network to the end user device. Different transcoding/transrating can be performed depending on the different protocols, coding and/or data rates supported, e.g., used by, the different possible source and destinations of content.

Bridge device 704 includes a transcoding module 724, a transrating module 726, a backup module 728, and a device matching module 729. In some, but not necessarily all embodiments, the bridge device 704 does not include a decoded video output which can be coupled directly to a display device. In such embodiments, the costs associated with supporting a decoded video output and interface (including, e.g., plug) are avoided. Thus, even in some embodiments where transcoding is supported, a decoded video output may be omitted from the bridge device 704. In one exemplary embodiment, bridge device 704 is used as the bridge device 300 of FIG. 3. In such an embodiment, transcoding module 724 is transcoding module 330 of FIG. 3 and transrating module 726 is transrating module 332 of FIG. 3. In the FIG. 3 system rate determination module determines the data rate of content being or to be supplied to the bridge device 300 for delivery to another device as well as data rates supported by the device to which the content is being delivered. Separate sub-modules may, and sometimes are, provided for each of these rate determination functions. The determination of the rate of content being or to be supplied to the bridge device may be made from stored information providing information about the rate used by the source device and/or from analysis of the rate of actual content received from the first device. Coding format determination module 344 determines the coding format of content being supplied, or to be supplied, to the bridge device 300 for delivery to another device as well as coding formats supported by the device to which the content is to be delivered. Separate sub-modules may, and sometimes are, provided for each of these coding determination functions. The determination of the coding format of content being or to be supplied to the bridge device may be made from stored information providing information about the coding format used by the source device and/or from analysis of the coding format of actual content received from the source device. The coding formats supported by the device to which content is being supplied may be obtained from information stored in the bridge device indicating the destination device's capabilities. Recoding determination module 346 determines when transcoding, transrating and/or both transrating and transcoding is to be performed. Recoding is to be performed when the rate and/or coding of content being supplied by a first device is does not match a rate and/or coding format supported by the device to which the content is to be delivered. If the source device provides the content in a coding format and at a rate supported by the destination device, changes in the data rate and/or coding format need not be made by the bridging device.

Transcoding module 724 converts between different formats, e.g., between an MPEG2 format and an MPEG4 format. The conversion may also be between different levels supported within a given coding format, e.g., between a high resolution level and lower or standard definition level or coding format. Transrating module 726 is used to support changes in data rates allowing the data rate of streamed content to be changed as it is communicated between different devices supporting, e.g., different data rates. The change in data rates may be implemented through the use of encoding constraints and/or changes in the coding format used. Backup module 728 performs operations to store information, e.g., content being communicated between different end user devices, in a network storage device, e.g., via a cable network connection. Thus, content being supplied to or from an end user device can be backed up prior to, or following, transrating or transcoding thereby making it available from the network for later delivery to another device. Device matching module 729 access stored memory in bridge device 704 associating different devices, e.g., by device ID or another identifier which may be included with supplied content or sent separately from content being supplied, with a set of information including format information, data rate information, and protocol information supported, e.g., used by, the device, and identifies the formats, data rates, and/or protocols used by the individual device or devices. Device matching module 729 may include stored information indicating, in addition to individual end user device capabilities, information indicating what data rates/coding is to be used for pairs of end user devices communicating with one another and, optionally, what transcoding and/or transrating operation(s) are to be preformed when two particular end user devices communicate. While transcoding/transrating information for device pairs may be stored, it can also be dynamically determined based on stored information about the capability of the end user device to which content is being directed and from the characteristics of received content, e.g., data rate and/or coding format, supplied by as source device, e.g., end user device or device on the cable network.

User device 1 710 is, e.g., a personal computer using MPEG2, while user device 2 712 is, e.g., a personal data assistant (PDA) using MPEG4. Arrow 730 illustrates that content, e.g., video and/or audio, from user device 1 710 which is in a first format and is communicated at a first data rate is sent to bridge device 704 which performs transcoding and transrating resulting in content being conveying in a second format and at a second data rate to user device 2 712, wherein the first format is different form the second format and the first data rate is different from the second data rate. Arrow 732 illustrates that content, e.g., video and/or audio, from user device 2 712 which is in the second format and is communicated at the second data rate is sent to bridge device 704 which performs transcoding and transrating resulting in content being conveying in the first format and at the second data rate to user device 1 710. Arrow 734 indicates that the bridge device 704 sends backup of content communicated between the first and second devices (710, 712) via cable network 702 to network storage device 706. Note that the transcoding/transrating of content communicated to the second end user device may, and often does, follow transcoding/transrating of content supplied from the cable network to the second end user device via the cable network and bridge device 704.

Figure 8:
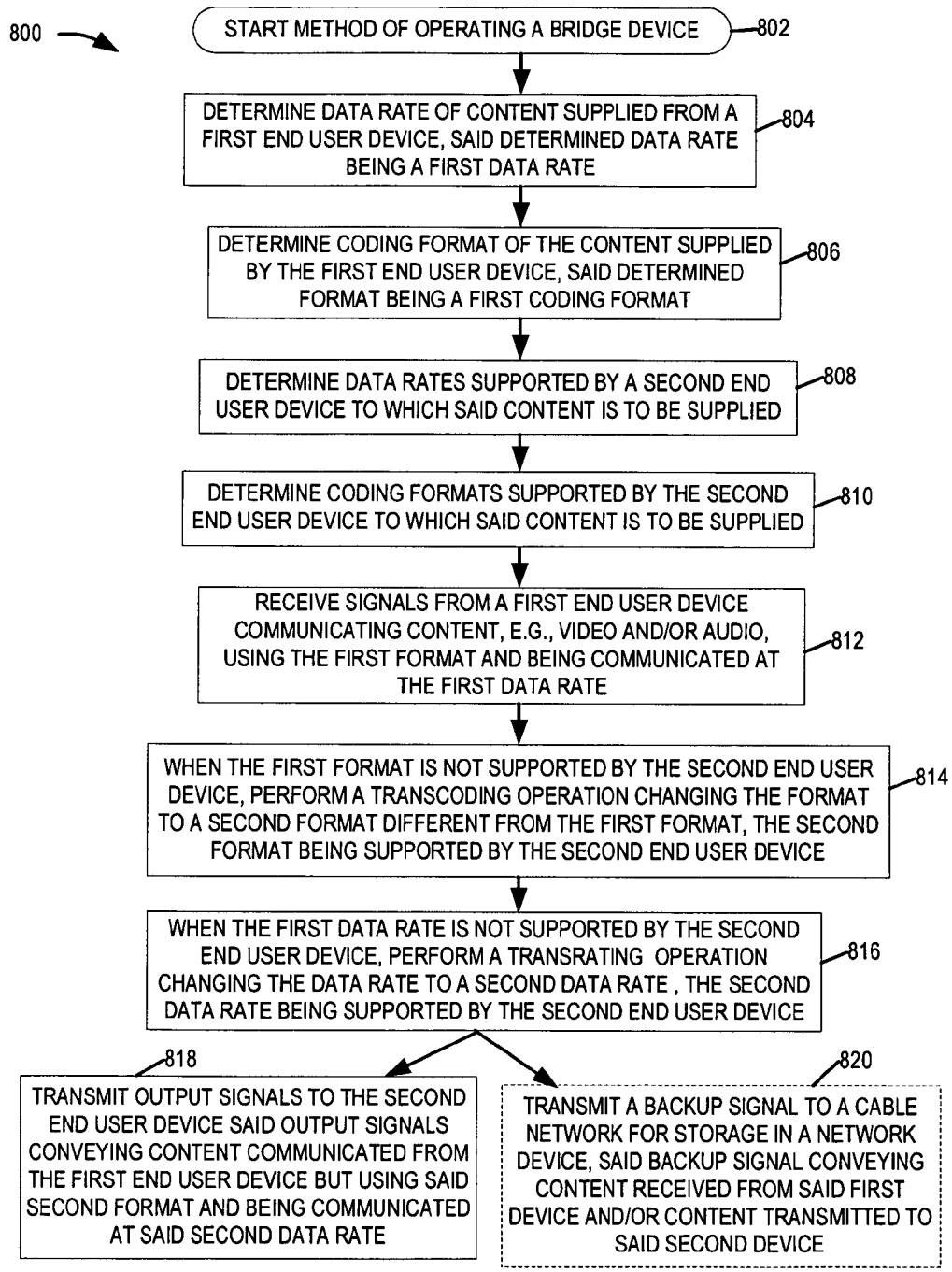
FIG. 8 is a flowchart of an exemplary method of operating a bridge device, e.g., bridge device of FIG. 7, in accordance with the present invention.

FIG. 8 is a flowchart 800 of an exemplary method of operating a bridge device, e.g., bridge device 700 of FIG. 7, in accordance with the present invention. Operation of the method starts in step 802 where the bridge device is powered on and initialized. Operation proceeds from start step 802 to step 804. In step 804, the bridge device determines data rate of the content supplied, or to be supplied, from a first end user device, said determined data rate being a first data rate. Operation proceeds from step 804 to step 806. In step 806, the bridge device determines the coding format of the content supplied, or to be supplied, by the first end user, said determined coding format being a first coding format. This may be done by analyzing content supplied to the bridge device or by using stored information indicating the content and/or data rate used by the device supplying the content. The operation proceeds from step 806 to step 808. In step 808, the bridge device determines data rates supported by a second end user device to which said content is to be supplied. Operation proceeds from step 808 to step 810. In step 810, the bridge device determines coding formats supported by the second end user device to which said content is to be supplied. Information about rates and/or formats supported by the second device may be, and sometime is, obtained by accessing stored information indicating format(s)/rate(s) supported by the second end user device or by receiving information from the second end user device indicating which formats it supports. The bridge device makes such determinations, e.g, the data rate and coding format being supported by the second device, in order to determine if a transcoding operation and/or a transrating operation is needed. Following step 810, the operation proceeds from to step 812. In step 812, the bridge device receives signals from the first end user device communicating content, e.g., video and/or audio, using the first format and being communicated at the first data rate. Operation proceeds from step 812 to step 814. In step 814, when the first format is not supported by the second end user device, the bridge device performs a transcoding operation changing the format to a second format which is different from the first format, the second format being supported by the second end user device. Transcoding is performed in step 814 if the first format is supported by the second device. Then in step 816, in cases where the first data rate is not supported by the second end user device, the bridge device performs a transrating operation changing the data rate to a second data rate which is different from the first data rate, the second data rate being supported by the second end user device. Transrating is skipped if the first data rate is supported by the second device. In some embodiments the transcoding and transrating are performed as part of a joint operation in which steps 814 and 816 may be performed together, e.g., in a single re-coding operation. Operation proceeds from step 816 to step 818 and, in some embodiments, from step 816 to step 820.

In step 818 the bridge device transmits output signals to the second end user device said output signals conveying content communicated from the first end user device but using said second format and being communicated at the second data rate. In step 820 the bridge device transmits a backup signal to a cable network for storage in a network device, said backup signal conveying content received from said first device and/or content transmitted to the second device.

In one exemplary embodiment, the bridge device is bridge device 704, the first user device is user device 1 710 which uses MPEG2, and the second user device is user device 2 712 which uses MPEG4. In some embodiments, the bridge device stores information associating different end user devices with different formats, data rates and/or protocols. In some such embodiments, when one end user devices wishes to transmit content to and/or receive content from another end user device, the bridge device accesses its stored information and identifies the formats, data rates and/or protocols used by the two end user devices and uses such information to select the appropriate transcoding and/or transrating operations.

While described in the context of a video system, it should be appreciated that the methods and apparatus of the present invention are not limited to the delivery of video content via a cable network and can be used to support delivery of audio content and/or other types of information content via the cable network.

In various embodiments system elements described herein are implemented using one or more modules which are used to perform the steps corresponding to one or more methods of the present invention, for example, receiving content, e.g., via a cable network, operating a bridge device to interface, e.g., between a cable network and at least one of a non-cable network and an end user device, tuning to a channel specified by an end user device, operating the bridge device to communicated encoded content, performing a decryption operation, performing an encryption operation, performing a transcoding operation, performing a transrating operation, performing a protocol conversion, performing a backup storage operation, identifying a format, rate and/or protocol associated with an end user device, etc. etc. Such modules may be implemented using software, hardware or a combination of software and hardware. Each step may be performed by one or more different software instructions executed by a processor, e.g., CPU.

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of operating a bridging device including a tuner to provide content, comprising:
   receiving content via a cable network;
   tuning to a channel specified by an end user device in response to a signal from the end user device;
   interfacing between said cable network and said end user device, said interfacing including:
      performing a transrating operation to produce a second bitstream having a lower data rate than the data rate of a first bitstream including the received video content; and
      communicating said second bitstream to the end user device, said second bitstream communicating encoded video data including video content, received from the cable network on the channel specified by said end user device, to the end user device.

2. The method of claim 1, wherein said end user device is one of: an IP device, a media capable device, a cell phone, a personal data assistant, or a personal computer.

3. The method of claim 1,
   wherein said end user device is coupled to said bridging device via a non-cable network; and
   wherein said non-cable network is one of: an Ethernet or a wireless network.

4. The method of claim 1, further comprising:
   prior to communicating said second bitstream communicating encoded video data including video content to the end user device:
   decrypting encrypted video content received from the cable network; and
   re-encrypting the decrypted video content using a different encryption method than was used to encrypt the video content received from the cable network, said re-encrypted video content including said encoded video data communicated to the end user device.

5. The method of claim 1, further comprising:
   prior to communicating said second bitstream communicating encoded video data including video content to the end user device:
   transcoding video content received from the cable network in a first encoded format to produce video content in a second encoded format, said second encoded format being different from the first encoded format, said encoded video data communicated to the end user device including content in said second encoded format.

6. A method of operating a bridging device including a tuner to provide content, comprising:
   receiving content via a cable network;
   tuning to a channel specified by a end user device in response to a signal from the end user device;
   interfacing between said cable network and at least one of: i) a non-cable network or ii) said end user device;
   transcoding video content received from the cable network in a first encoded format to produce video content in a second encoded format said second encoded format being different from the first encoded format, said encoded video data communicated to the end user device including content in said second encoded format, said transcoding of the video content producing a second bitstream having a lower data rate than the data rate of a first bitstream including the received video content; and
   communicating said second bitstream to the end user device, said second bitstream communicating encoded video data including video content, received from the cable network on the channel specified by said end user device, to the end user device.

7. The method of claim 6, wherein said transcoding is performed as part of said interfacing operation.

8. The method of claim 6, further comprising:
   performing a protocol conversion operation to convert between a communications format used by said cable network and a communications format used by said non-cable network.

9. A method of operating a bridging device including a tuner to provide content, comprising:
   receiving content via a cable network;
   tuning to a channel specified by an end user device in response to a signal from the end user device;
   interfacing between said cable network and at least one of: i) a non-cable network or ii) said end user device; and
   wherein said bridging device does not have a video decoder for generating decoded video.

10. A method of operating a bridging device including a tuner to provide content, comprising:
    receiving content via a cable network;
    tuning to a channel specified by an end user device in response to a signal from the end user device;
    interfacing between said cable network and at least one of: i) a non-cable network or ii) said end user device; and
    wherein said bridging device does not have a decoded video output.

11. The method of claim 1 further comprising:
receiving content from a first end user device; and
processing the content from the first end user device by performing at least one of: i) a transcoding or ii) transrating operation to generate processed content; and
transmitting the processed content to a second end user device.

12. A method of operating a bridging device including a tuner to provide content, comprising:
receiving content via a cable network;
tuning to a channel specified by an end user device in response to a signal from the end user device;
interfacing between said cable network and at least one of: i) a non-cable network or ii) said end user device;
receiving content from a first end user device;
determining at least one of a data rate and coding format of content supplied by the first user device;
processing the content from the first end user device by performing at least one of: a transcoding or ii) transrating operation to generate processed content; and
transmitting the processed content to a second end user device;
wherein transcoding is performed as part of said processing when the coding format of content supplied by the first user device is different from a coding format supported by the second user device; and
wherein transrating is performed as part of said processing when the data rate of content supplied by the first user device is different from a data rate supported by the second user device.

13. A bridging device, comprising:
a cable network interface for receiving content via a cable network;
a second interface for interfacing said bridging device to at least one of i) a non-cable network or ii) an end user device;
a tuner module for tuning to a channel specified by said end user device in response to a signal from the end user device;
a rate determination module adapted to determine a data rate of content supplied by a first end user device; and
a protocol conversion module for performing a protocol conversion between a first protocol used by said cable network interface and a second protocol used by said second interface, said second protocol being different from said first protocol.

14. The bridging of claim 13, wherein said end user device is one of: an IP device, a media capable device, a cell phone, a personal data assistant, or a personal computer.

15. The bridging device of claim 13,
wherein said second interface interfaces said bridging device to said non-cable network,
wherein said non-cable network is one of: an Ethernet or a wireless network;
wherein said end user device can be coupled to said bridging device via said non-cable network; and
wherein said second interface includes at least one of a Media over Coax Alliance interface module or an Ethernet Interface module.

16. The bridging device of claim 13,
wherein said second interface interfaces said bridging device to said end user device, and
wherein said second interface includes at least one of a USB interface module, RS422 interface module or RS232 interface module.

17. The bridging device of claim 13, further comprising:
a decryption module for decrypting encrypted video content received from the cable network; and
an encryption module for re-encrypting the decrypted video content using a different encryption method than was used to encrypt the video content received from the cable network, and
wherein output of the encryption module is communicated via the second interface.

18. The bridging device of claim 13, further comprising:
a transcoding module for transcoding video content received from the cable network in a first encoded format to produce video content in a second encoded format, said second encoded format being different from the first encoded format, and
wherein encoded video data communicated to the end user device includes content in said second encoded format.

19. A bridging device, comprising:
a cable network interface for receiving content via a cable network;
a second interface for interfacing said bridging device to at least one of i) a non-cable network or ii) an end user device;
a tuner module for tuning to a channel specified by said end user device in response to a signal from the end user device;
a protocol conversion module for performing a protocol conversion between a first protocol used by said cable network interface and a second protocol used by said second interface, said second protocol being different from said first protocol;
a transcoding module for transcoding video content received from the cable network in a first encoded format to produce video content in a second encoded format, said second encoded format being different from the first encoded format, said transcoding module producing a second bitstream having a lower data rate than the data rate of a first bitstream including the received video content, said second bitstream being communicated to the end user device; and
wherein said second bitstream communicated to the end user device communicates encoded video data including content in said second encoded format.

20. A bridging device, comprising:
a cable network interface for receiving content via a cable network;
a second interface for interfacing said bridging device to an end user device, said second interface including at least one of a USB interface module, RS422 interface module or RS232 interface module;
a tuner module for tuning to a channel specified by said end user device in response to a signal from the end user device;
a protocol conversion module for performing a protocol conversion between a first protocol used by said cable network interface and a second protocol used by said second interface, said second protocol being different from said first protocol; and
a transrating module for performing a transrating operation to produce a second bitstream having a lower data rate than the data rate of a first bitstream including the received video content, said second bitstream being communicated to the end user device.

21. The bridging device of claim 13, wherein said protocol conversion module performs a protocol conversion operation to convert between a communications format used by said cable network and a communications format used by said non-cable network, and wherein said communications format used by said cable network is a cable modem communications protocol format and wherein said communications format used by said non-cable network is an Ethernet protocol format.

22. A bridging device, comprising:

a cable network interface for receiving content via a cable network;

a second interface for interfacing said bridging device to at least one of i) a non-cable network or ii) an end user device;

a tuner module for tuning to a channel specified by said end user device in response to a signal from the end user device;

a protocol conversion module for performing a protocol conversion between a first protocol used by said cable network interface and a second protocol used by said second interface, said second protocol being different from said first protocol; and wherein said bridging device does not have a video decoder for generating decoded video.

23. A bridging device, comprising:

a cable network interface for receiving content via a cable network;

a second interface for interfacing said bridging device to at least one of i) a non-cable network and ii) an end user device;

a tuner module for tuning to a channel specified by said end user device in response to a signal from the end user device;

a protocol conversion module for performing a protocol conversion between a first protocol used by said cable network interface and a second protocol used by said second interface, said second protocol being different from said first protocol; and wherein said bridging device does not have a decoded video output.

24. The device of claim 13, further comprising:

a coding format determination module adapted to determine a coding format of content supplied by the first end user device.

25. The device of claim 24, further comprising:

a recoding determination module for determining, with regard to content supplied by the first end user device to be communicated to a second end user device, i) if transrating is to be performed, ii) if transcoding is to be performed and iii) if transrating and transcoding is to be performed.

26. The method of claim 4, wherein said re-encryption is used for digital rights management (DRM); and wherein the re-encryption operation uses encryption which depends on which end user the re-encrypted content is to be delivered.

* * * * *